US008239503B2

(12) United States Patent
Vayssiere et al.

(10) Patent No.: US 8,239,503 B2
(45) Date of Patent: Aug. 7, 2012

(54) DISTRIBUTED SYSTEM ARCHITECTURE FOR VARIABLE COUPLING

(75) Inventors: Julien J. P. Vayssiere, Red Hill (AU); Stephen Milliner, Holland Park (AU); Kim Elms, Carindale (AU); Guy M. Redding, Greenslopes (AU)

(73) Assignee: SAP AG, Walldorf (DE)

( * ) Notice: Subject to any disclaimer, the term of this patent is extended or adjusted under 35 U.S.C. 154(b) by 2313 days.

(21) Appl. No.: 11/054,133

(22) Filed: Feb. 8, 2005

(65) Prior Publication Data

US 2006/0155868 A1 Jul. 13, 2006

(30) Foreign Application Priority Data

Dec. 20, 2004 (EP) .................................... 04293057

(51) Int. Cl.
*G06F 15/177* (2006.01)
*G06F 15/16* (2006.01)
*G06F 9/455* (2006.01)

(52) U.S. Cl. .............................. 709/221; 709/202; 718/1
(58) Field of Classification Search .................. 709/202, 709/221; 718/1
See application file for complete search history.

(56) References Cited

U.S. PATENT DOCUMENTS

| 6,868,447 | B1 * | 3/2005 | Slaughter et al. | 709/225 |
| 7,146,617 | B2 * | 12/2006 | Mukundan et al. | 719/330 |
| 7,340,508 | B1 * | 3/2008 | Kasi et al. | 709/219 |
| 2004/0139157 | A1 * | 7/2004 | Neely et al. | 709/205 |

FOREIGN PATENT DOCUMENTS

| EP | 0940748 A2 | 9/1999 |
| EP | 1324193 A1 | 7/2003 |

OTHER PUBLICATIONS

Stroulia, E., et al., "Constructing XML-speaking Wrappers for WEB Applications: Towards and Interoperating WEB", Computing Science Department,(Nov. 23, 2000).

* cited by examiner

*Primary Examiner* — George C Neurauter
(74) *Attorney, Agent, or Firm* — Schwegman, Lundberg & Woessner, P.A.

(57) ABSTRACT

A distributed computer system in several embodiments includes several architectures or configurations. Each configuration exhibits a different degree of coupling between an application that provides data and an application that consumes that data. In an embodiment, a provider application knows the identity of a consumer application, converts data into the format of the consumer application, and transmits the data to the consumer application. In other embodiments, the provider application does not know the identity of the consumer application, and transmits data to the consumer application through an intermediary. In such embodiments, either the provider or the intermediary can perform the data conversion. In another embodiment, a manager object oversees the transformation of the system from one configuration to another in real time.

26 Claims, 9 Drawing Sheets

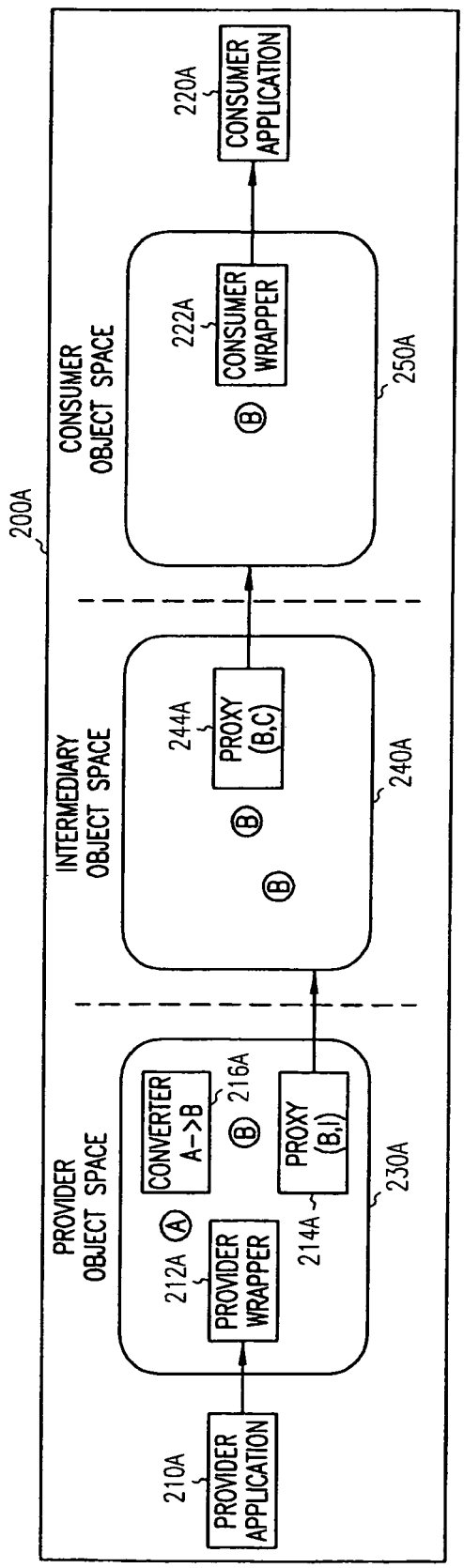
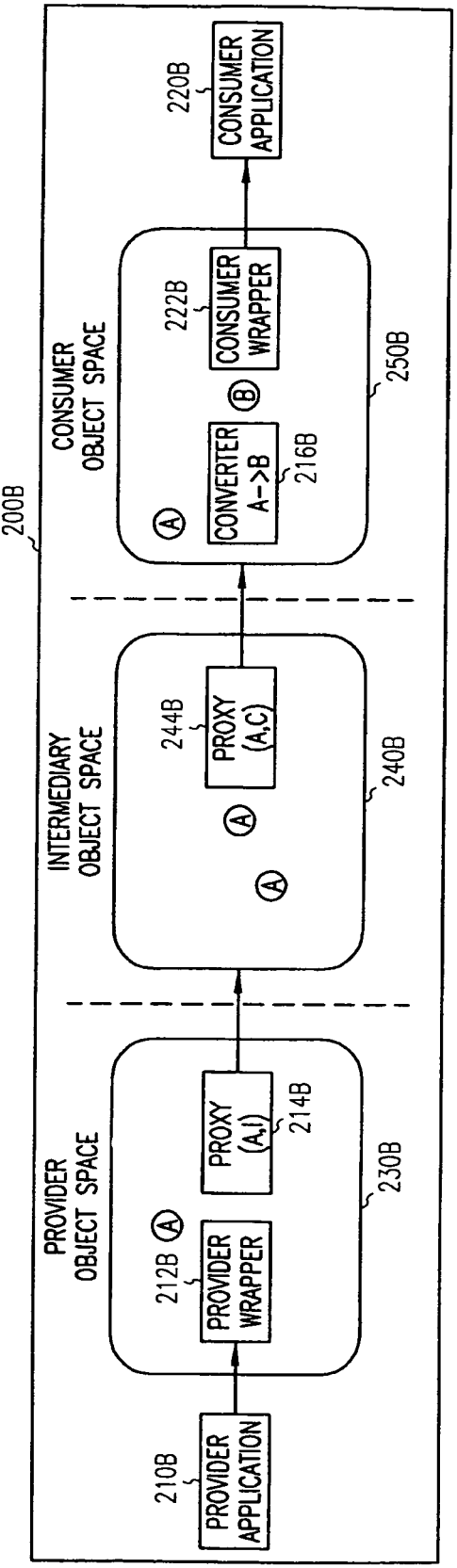
FIG. 2A
FIG. 2B

DISTRIBUTED SYSTEM ARCHITECTURE FOR VARIABLE COUPLING

RELATED APPLICATIONS

The present patent application claims the priority benefit of the filing date of European Application (EPO) No. 04293057.8 filed Dec. 20, 2004, which is incorporated herein by reference.

TECHNICAL FIELD

The present application relates to computer systems communication, and in particular, a system and method to enhance the performance and adaptability of computer systems communication.

BACKGROUND

In information technology, distributed systems are ubiquitous. Distributed systems consist of two or more modules, objects, programs, and/or subsystems that directly or indirectly communicate with each other. A distributed system may be resident on two or more machines or nodes, or it may be implemented on a single machine. The degree to which the sub-systems of a distributed system can communicate with each other varies from one distributed system to another. In many circumstances unfortunately, the degree and ease of communication between the parts of a distributed system is not extensive. This difficulty in communications is a virtual certainty in situations where one business organization's information system needs to communicate with another business organization's information system. Because of the diversity of information systems, operating systems, software packages, and data formats, linking up two information systems is often a very daunting task. Moreover, in the design of distributed systems, there is an inherent trade off between flexibility and performance. That is, distributed systems that can adapt to change gracefully often exhibit poor performance, while systems that exhibit high performance usually achieve that high performance at the expense of flexibility.

One method of communication between two information systems is through a "hardwiring" of the systems. In a hardwired set up, a part of each system is re-engineered to comply with a set of specifications that are agreed upon by the owners of the systems. These specifications may include data formats and encoding, communication protocols, communication networks, network addresses, and security measures. One perceived problem with a hardwired approach is its inflexibility. That is, its inability to easily adapt to changes in the information processing environment.

Another communication method between two information systems employs a middleware library. In this particular situation, the term middleware refers to a software library that the information system owners use to ease the task of re-engineering their information systems. In these cases, the middleware is used to address the interoperability issues of encoding, addressing, transport, and security. Examples of such middleware solutions include CORBA and the Web services protocol stack. While it is generally perceived that a middleware setup is more flexible than a hardwired approach, the performance of a middleware setup is not as good as that of a hardwired approach.

Yet still another method that has been used to gain interoperability between information systems is through the use of an intermediary. An intermediary information system, often operated by a third party, acts as a mediator between two information systems. It is generally perceived in the art that an intermediary approach is very flexible (since either information system can change its side without regard to the other (since the intermediary handles compatibility issues). However, it is further perceived in the industry that intermediary approaches lack performance, since most if not all communications must go through the intermediary, and be processed therein.

SUMMARY

An embodiment of the invention uses multiple configurations, and the ability to transform from one configuration to another, to make distributed computer systems more adaptable and also increase the performance of such systems. In an embodiment, the system can run under one of three configurations at any particular instance. All the configurations have a provider object space which generates data, and a consumer object space which uses that generated data. Two of the configurations also have an intermediary object space. In one embodiment of the invention, the provider object space converts data from its format to the format that the consumer expects, and also sends this data to the consumer object space. This embodiment is the most tightly coupled, and the highest performing configuration. In another embodiment, the provider object space converts data from its format to the format expected by the consumer object space, but sends the converted data through an intermediary. In yet another embodiment, the provider sends data, in its own format, to an intermediary object space, and the intermediary object space converts the data from the provider's format into the consumer's format, and then the intermediary transfers the data to the consumer object space. This embodiment is the least coupled, and hence the most adaptable. In another embodiment, a manager object oversees the transformation from one configuration to another. The ability to change from one embodiment of the invention to another is a runtime adaptability—that is, being able to modify a running system without having to restart the system.

BRIEF DESCRIPTION OF DRAWINGS

FIG. 2 illustrates an embodiment of the invention in which parts of a computer system are coupled to an intermediate degree.

DETAILED DESCRIPTION OF EMBODIMENTS

Figure 1:
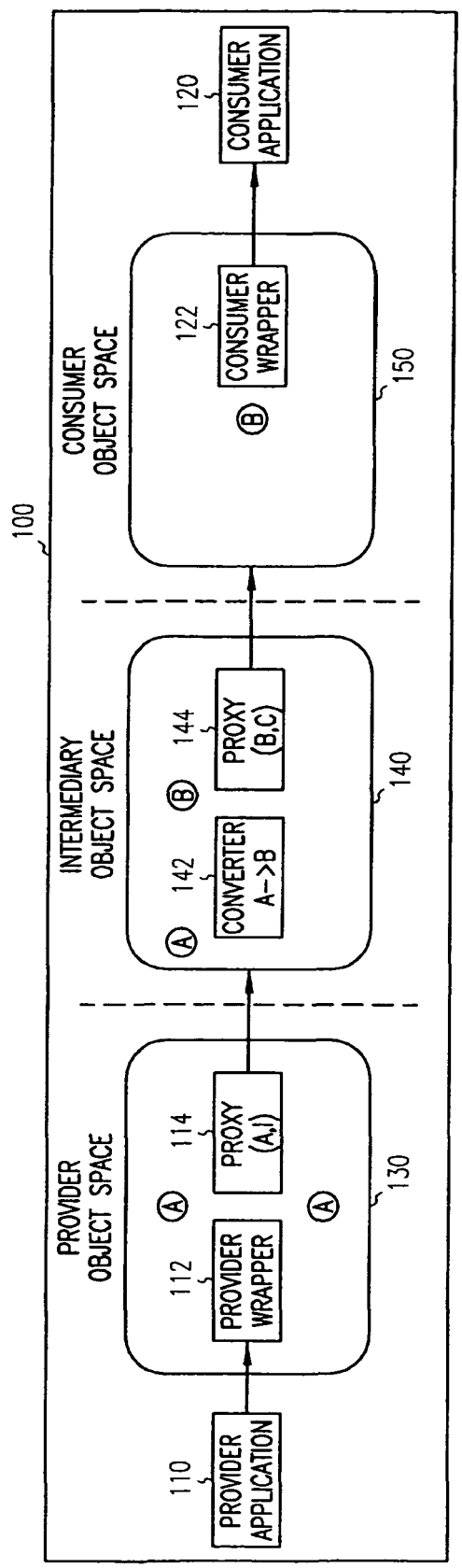
FIG. 1 illustrates an embodiment of the invention in which parts of a computer system are loosely coupled.
Figure 3:
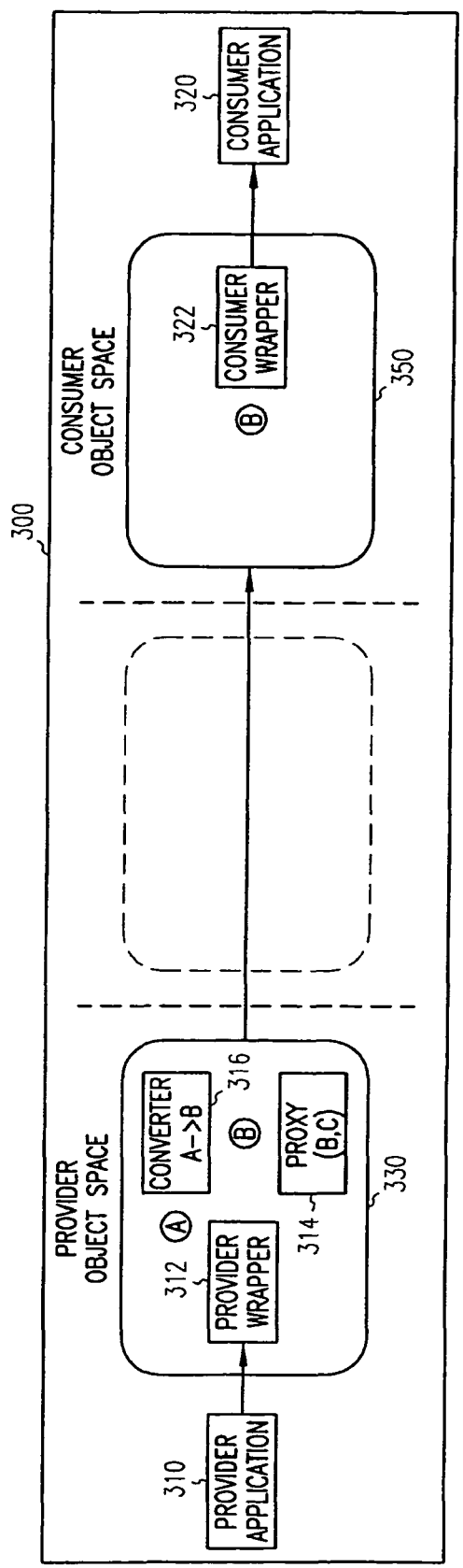
FIG. 3 represents an embodiment of the invention in which parts of a computer system are tightly coupled.

The information system of an embodiment of the invention has three configurations. The configurations are referred to as mediation, adaptation, and crystallization, and are illustrated in FIGS. 1, 2, and 3 respectively. For simplicity and ease of explanation, the embodiments will be described in connection with a system that has a server that produces data (provider) and a server that receives and uses that data (consumer). However, persons of skill in the art will realize that more complicated systems involving multiple providers, consumers, and servers could be used in connection with embodiments of the invention.

An embodiment of the mediation configuration uses an intermediary server that is responsible for translating between data formats of the two or more information systems (provider and consumer) and transmitting information to the consuming information system. An embodiment of the adaptation configuration uses an intermediary also, but the task of converting between data formats lies with the provider system. In an embodiment of the crystallization configuration, there is no intermediary, and the provider system translates the data format, and then transmits the data to the consumer system. These configurations, and the ability of embodiments of the invention to transform among them in a run time or real time manner, provide the attributes of both adaptability and high performance.

In navigating among the mediation, adaptation, and crystallization configurations, embodiments of the invention manage several properties of a distributed system. These properties may include identification of the parties (systems) that are to communicate, the communication mode (protocol) to be used, and the data syntax (data format) to be used in the communication. Regarding the identification of the parties, embodiments of the invention manage such aspects as whether the parties know each other and communicate directly, or whether they communicate without knowing each other (through an intermediary for example). Also, regarding the communication modes, embodiments of the invention manage whether the parties communicate directly using an underlying infrastructure such as a network, IP stack, or HTTP protocol, or whether the parties communicate through an intermediary that sits on the same layer as they do. If communication is through an intermediary, the intermediary relieves the parties of the task of having to know how to communicate with the other party.

FIGS. 1, 2, and 3 illustrate embodiments of three configurations that are used in connection with the invention, e.g., the mediation, adaptation, and crystallization configurations. In general, the mediation configuration is the most loosely coupled, and the crystallization configuration is the most tightly coupled.

Specifically, as illustrated in FIG. 1, a mediation configuration 100 has a provider object space 130, an intermediary object space 140, and a consumer object space 150. In this embodiment, an object space is a server that performs two functions. First, the object space is a storage place for objects. It is somewhat akin to an un-structured database in that objects can be written to the object space, and programs can query the object space for objects. Second, an object space serves as an execution environment for programs. That is, programs can run on the object space and access the objects that exist in that object space. Moreover, in this embodiment of the invention, programs can move between object spaces while retaining their state of execution. It is this feature of this embodiment that contributes to the adaptability and high performance of distributed systems that implement embodiments of the invention.

The provider object space 130 has a provider application 110, a provider wrapper 112, and a proxy object 114. In such an embodiment, a proxy object is an object whose function is to forward method calls to another object, e.g., to transmit data to a remote object space. Different proxy objects may use different communication details (e.g., network protocols, application level protocols, compression schemes, security procedures, etc). As another example, an embodiment of the invention may have a converter object. A converter object converts instances of one data type into instances of another data type. Other embodiments have wrapper objects. Wrapper objects convert between a protocol spoken by one legacy application (provider or consumer) into a protocol that is understandable by an object space. The intermediary object space 140 has a converter 142 and a proxy object 144. The consumer object space 150 has consumer wrapper 122 and consumer application 120.

FIG. 2 illustrates an embodiment of an adaptation configuration. Like the mediation configuration, an adaptation configuration 200 has a provider object space 230, an intermediary object space 240, and a consumer object space 250. The provider object space 230 has a provider application 210, a provider wrapper 212, a proxy object 214, and a converter 216. The intermediary object space 240 has a proxy object 244. The consumer object space 250 has a consumer application 220 and a consumer wrapper 222.

FIG. 3 illustrates an embodiment of a crystallization configuration of the invention. In this embodiment, the crystallization configuration 300 has a provider object space 330 and a consumer object space 350. The provider object space 330 has a provider application 310, a provider wrapper 312, a proxy object 314, and a converter 316. The consumer object space 350 has a consumer application 320 and a consumer wrapper 322. The circled A's and Bs in FIGS. 1, 2, and 3 indicate the data format(s) that appear in that object space, wherein the A's represent data that is generated by the provider applications 110, 210, and 310, and the B's represent the data format used by the consumer applications 120, 220, and 320.

FIGS. 1, 2, and 3 further illustrate why the mediation configuration is the most loosely coupled, and the crystallization configuration is the most tightly coupled. First, coupling refers to the amount of specific information about a consumer application that a provider application needs in order to communicate with the consumer application. In one embodiment, that specific information includes the identity of the consumer application, the communication protocol that the consumer application expects, the data format that is expected by the consumer application, and whether the data provider will have to do the formatting.

Consequently, a mediation configuration is the least coupled since the provider does not need to know the identity of the consumer (since all communication goes through an intermediary), a provider does not need to know how to talk to a consumer (since communication to a consumer is handled entirely by an intermediary), and the provider does not need to know the data format that a consumer expects (because transformation of the data is handled by an intermediary). In contrast, in an embodiment with a crystallization configuration, a provider handles both data type conversion and communication with a consumer (because there is no intermediary), so this is a more tightly coupled system. An embodiment using the adaptation configuration lies somewhere in the middle of the coupling spectrum, since a provider handles the data conversion, but the communication and identity are handled by an intermediary. The degree of coupling among the three configurations is summarized in the following table:

|  | Identity/Communication | Data Format |
| --- | --- | --- |
| Mediation | No | No |
| Adaptation | No | Yes |
| Crystallization | Yes | Yes |

In an embodiment of the invention, it is the ability to transition from one configuration to another that permits the utilization of the advantages, and avoidance of the drawbacks, of each configuration. For example, to transition from a mediation configuration to an adaptation configuration, a proxy object (B,I) must be created (or reactivated) in the provider object space, a converter object must be copied (or reactivated) into the provider object space, and a proxy object (A,I) must be removed (or deactivated) from the provider object space. The copying of the converter object may be done before creating (or reactivating) the proxy (B,I) in the provider object space. The notation used in connection with the proxy objects indicates first the data format that is being transferred, and second the object space to which it is transferred. For example, the proxy object (A,I) transfers data in format A to the intermediary object space.

In transitioning from an adaptation configuration to a mediation configuration, a proxy object (A,I) is reactivated in the provider object space, a converter object is deactivated in the provider object space, a proxy object (B,I) is deactivated in the provider object space, and a converter object is created (or reactivated) in the intermediary object space. In an embodiment, proxy object (B,I) is not deactivated until there are no more instances of data type B in the provider object space. In another embodiment, the converter object is deactivated before the proxy object (A,I) is reactivated.

In an embodiment that transitions from an adaptation configuration to a crystallization configuration, a proxy object (B,C) is copied from an intermediary object space to a provider object space, and an proxy object (B,I) is deactivated in the provider object space. In embodiments that transition from a crystallization configuration to an adaptation configuration, a proxy object (B,C) in a provider object space is deactivated, a proxy object (B,I) in a provider object space is created (or reactivated), and a proxy object (B,C) is created (or reactivated) in the intermediary object space.

The previous paragraphs disclose the mechanics of transitions among mediation, adaptation, and crystallization configurations. The control and timing of such transitions among the configurations is handled by a manager object. A manager object runs on either the provider, intermediary, or consumer objects spaces. For example, in the embodiment of FIG. 1, the manager object may run on the provider object space. In the embodiment of FIG. 2, the manager object may run on the intermediary object space. In the embodiment of FIG. 3, the manager object may run on the consumer object space.

In an embodiment, there are several properties that may be associated with a manager object. First, a manager object may be notified of every incoming or outgoing object for the object space on which the manager object resides. Second, a manager object can activate or deactivate any program running on the object space on which the manager object resides. Third, a manager object can copy one of the local running programs into one of the other object spaces. This in effect boots up the execution of the program on the remote object space.

Figure 4A:
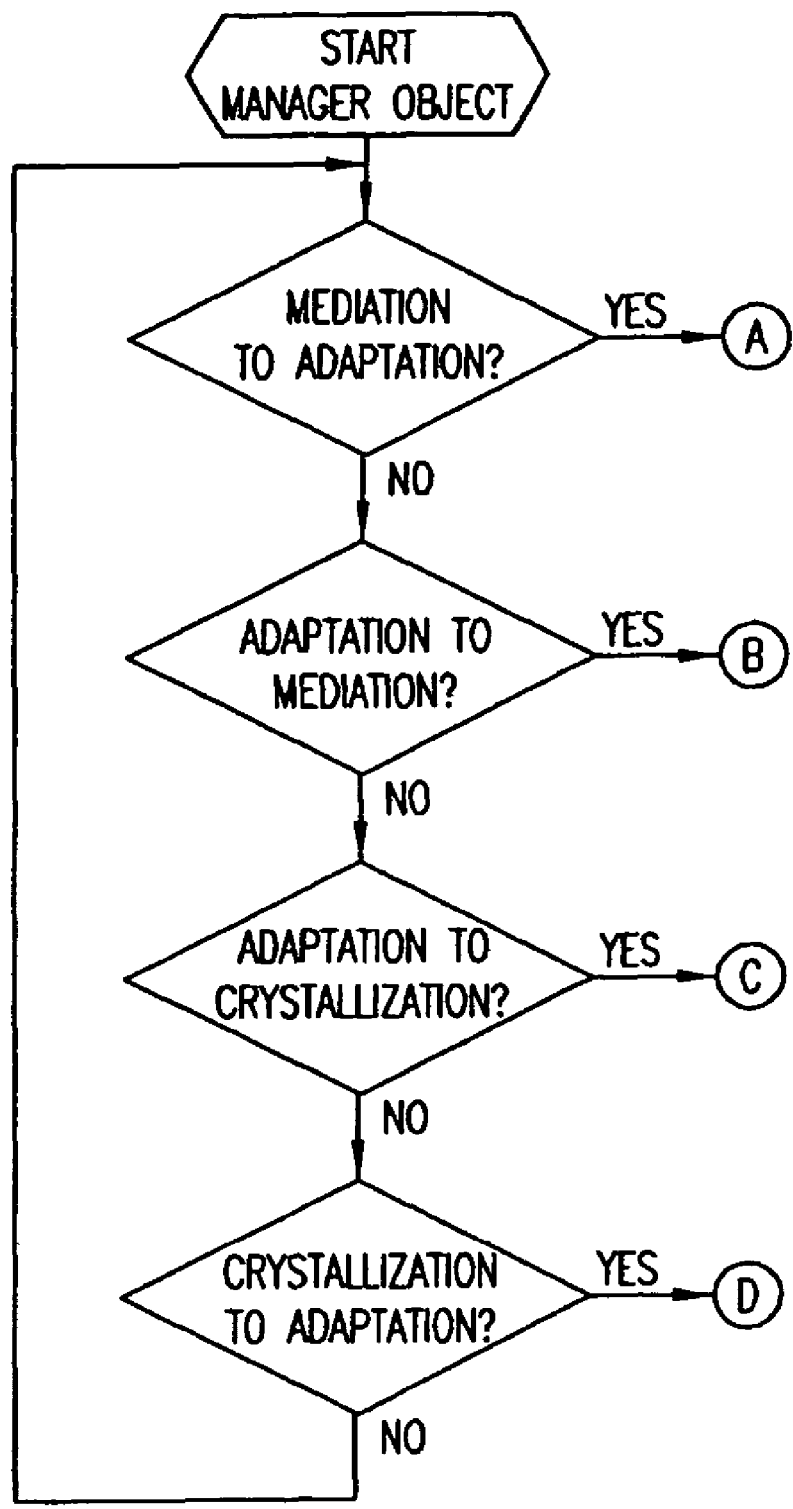
FIGS. 4*a*, 4*b*, 4*c*, 4*d*, and 4*e* are flow charts illustrating an embodiment of the invention.
Figure 4B:
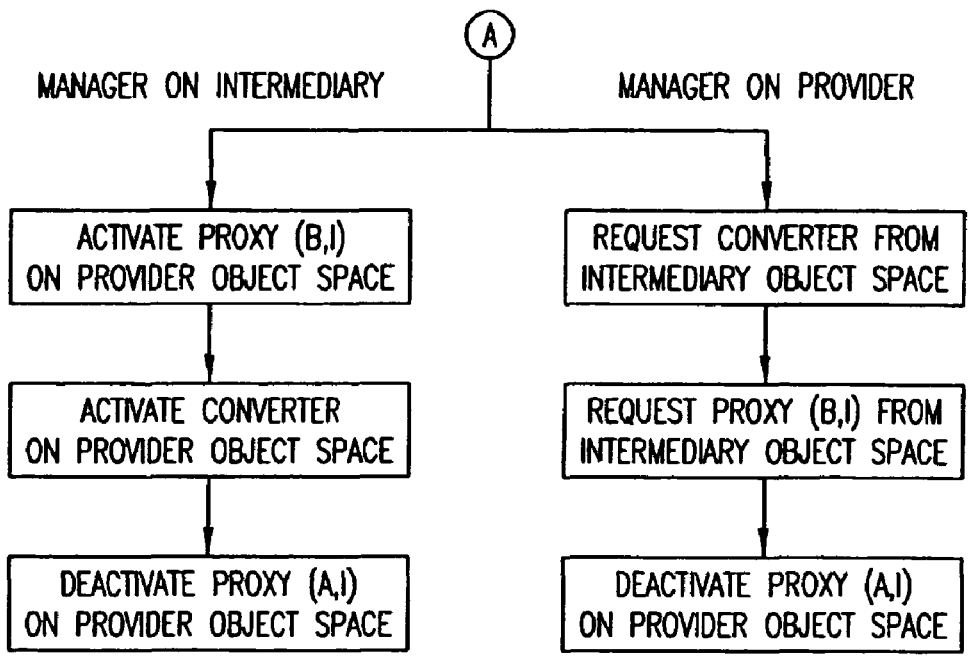

In an embodiment in which there is a transition from a mediation configuration to an adaptation configuration, two scenarios are involved. See FIGS. 4a and 4b. First, the manager object could reside on the intermediary object space, or the manager object could reside on the provider object space. If the manager object resides on the intermediary object space, the manager object copies the converter from the intermediary object space to the provider object space. The converter can then convert the data from the format used by the provider (A) into the format that is expected by the consumer (B). The manager object then activates a proxy object (B,I) that is responsible for transmitting data, already converted to the B format expected by the consumer, to the consumer through the intermediary. The manager object also requests the proxy that was executing in the provider object space (proxy (A,I)) to deactivate itself. In an alternative embodiment, proxy (A,I) could be coded in such a way that it deactivates itself when it recognizes the presence of proxy (B,I) in its object space. In an embodiment in which the manager object resides in the provider object space, the manager object may request that the converter from the intermediary object space be transferred to the provider object space. Furthermore, the manager object can activate proxy (B,I) and deactivate proxy (A,I).

Figure 4C:
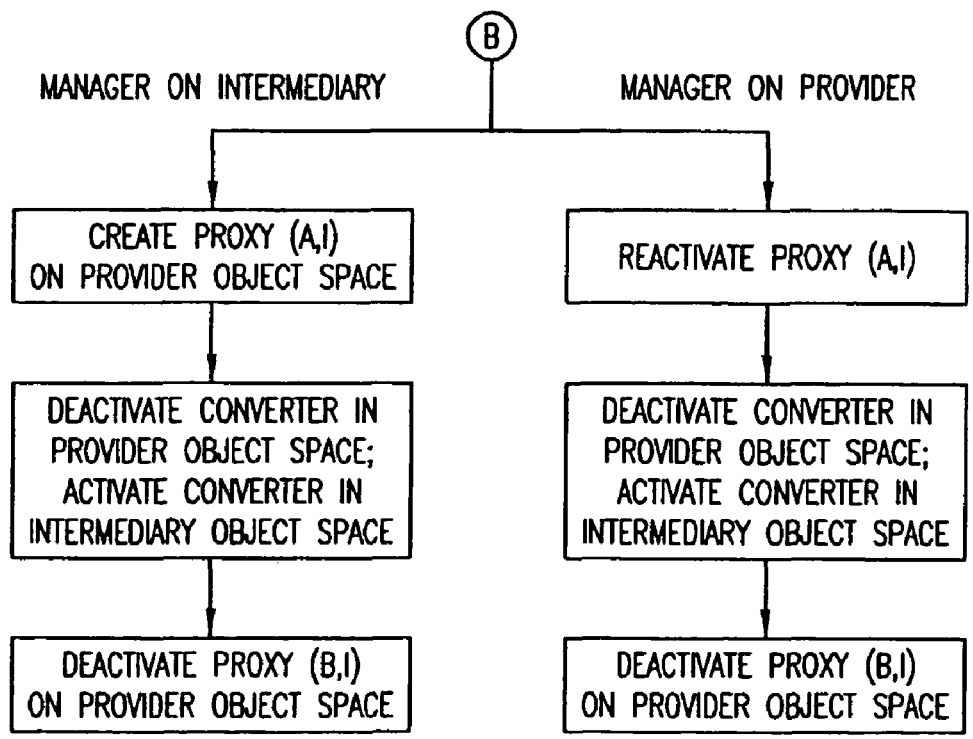

When transitioning from an adaptation configuration to a mediation configuration, there are two scenarios involved— the first is when the manager object resides on the intermediary object space, and the second in when the manager object resides on the provider object space. See FIGS. 4a and 4c. When the manager object resides on the intermediary object space, the manager object creates (writes) a proxy object (A,I) on the provider object space. If a proxy (A,I) already resides in the provider object space, the manager object reactivates it. The manager object requests deactivation of the converter that resides in the provider object space, and creates a converter in the intermediary object space. The manager object also requests the deactivation of proxy (B,I) in the provider object space. In an embodiment, the proxy (B,I) will terminate once all instances of data of type B have been sent to the intermediary object space. In an embodiment in which the manager object resides on the provider object space, the manager object reactivates the proxy object (A,I). The manager object further deactivates the converter in the provider object space, and reactivates the converter in the intermediary object space. The manager object also deactivates the proxy (B,I) in the provider object space.

Figure 4D:
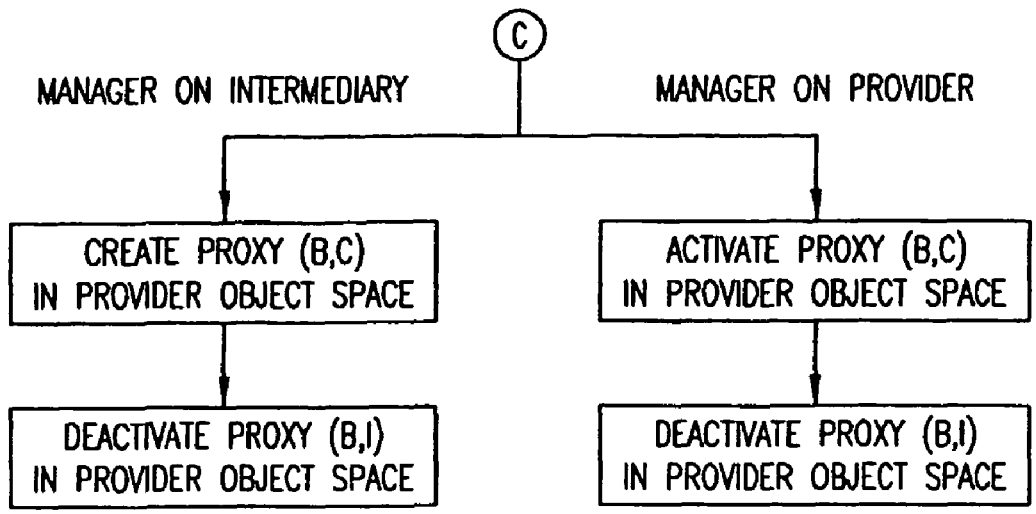

In embodiments wherein there is a transition from an adaptation configuration to a crystallization configuration, and the manager object is on the intermediary object space, the manager object writes a proxy object (B,C) to the provider object space. See FIGS. 4a and 4d. The manager object also requests deactivation of the proxy (B,I) in the provider object space. In this embodiment, the proxy (B,I) should terminate immediately, even if there are still instances of data type B in the provider object space. In an embodiment in which the manager object is on the provider object space, the manager object requests that the proxy (B,C) be activated locally, and the manager object deactivates proxy (B,I).

Figure 4E:
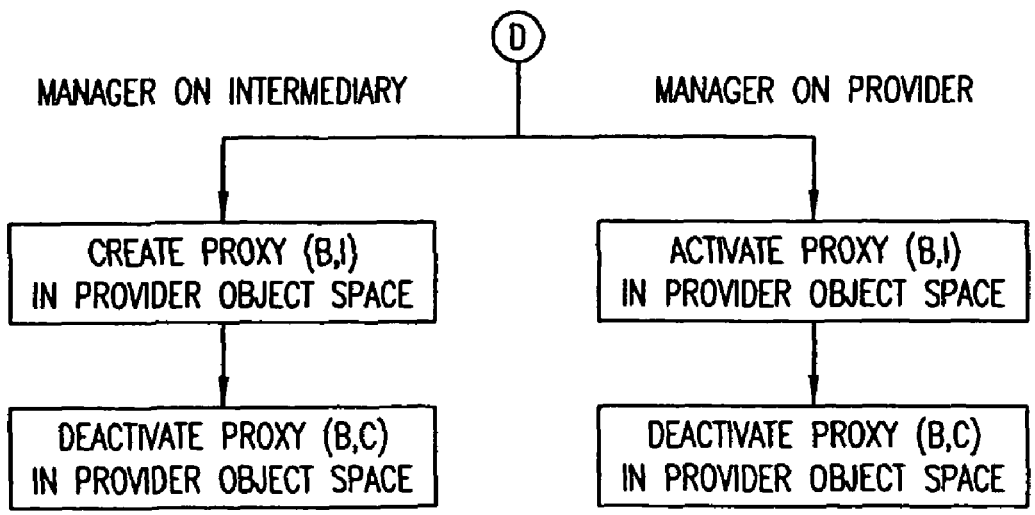

In embodiments in which a transition occurs from a crystallization configuration to an adaptation configuration, and the manager object is on the intermediary object space, the manager object writes a proxy object (B,I) to the provider object space. See FIGS. 4a and 4e. The manager object further requests deactivation of the proxy (B,C) in the provider object space. In this embodiment, the proxy (B,C) should terminate immediately, even if there are still instances of data format type B in the provider object space. In embodiments in which the manager object is on the provider object space, the manager object requests that proxy (B,I) be activated locally, and the manager object deactivates proxy (B,C).

Figure 5:
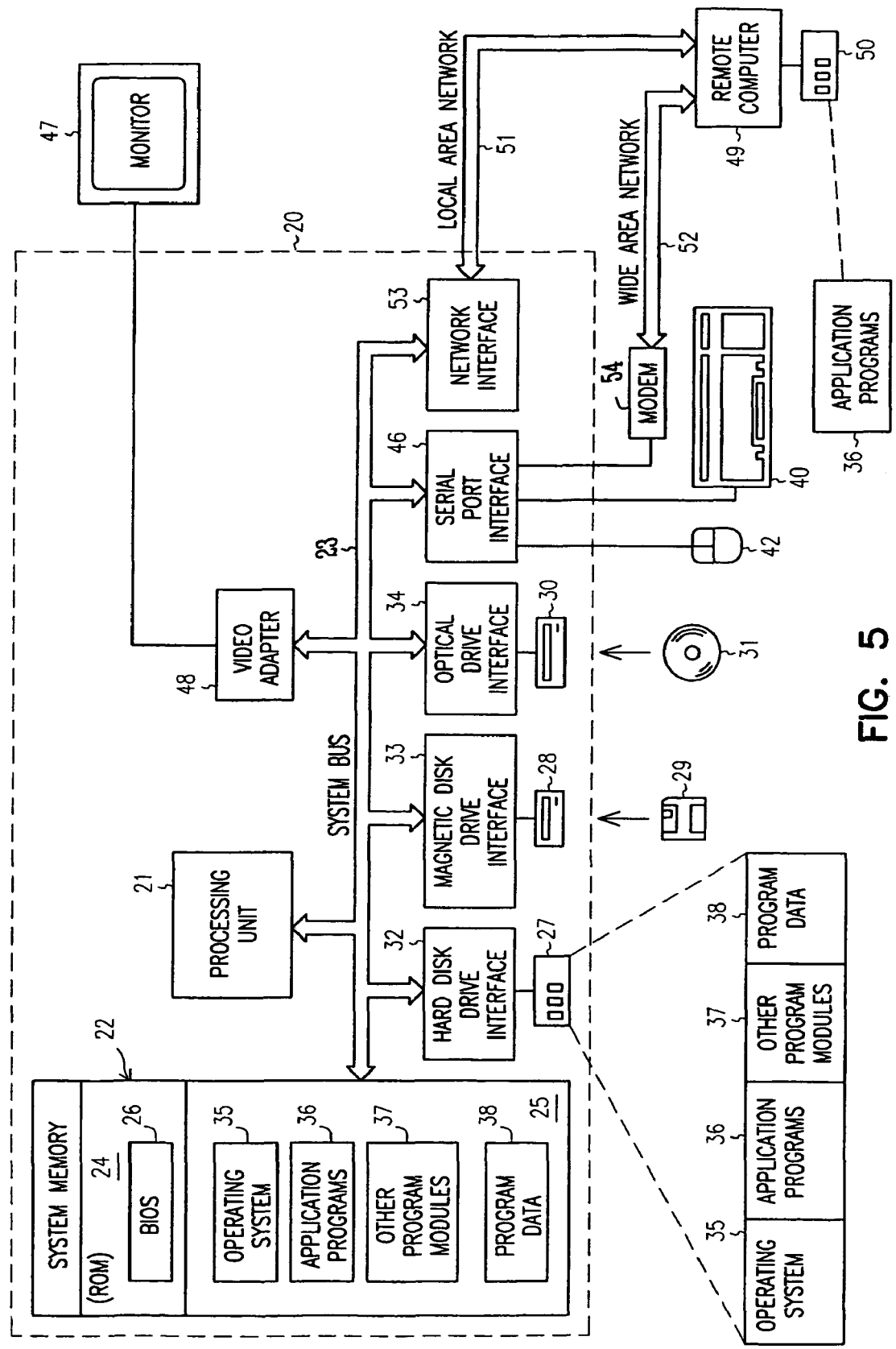
FIG. 5 illustrates a computer system upon which an embodiment of the invention may operate.

FIG. 5 is an overview diagram of a hardware and operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36/ other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Figure 6:
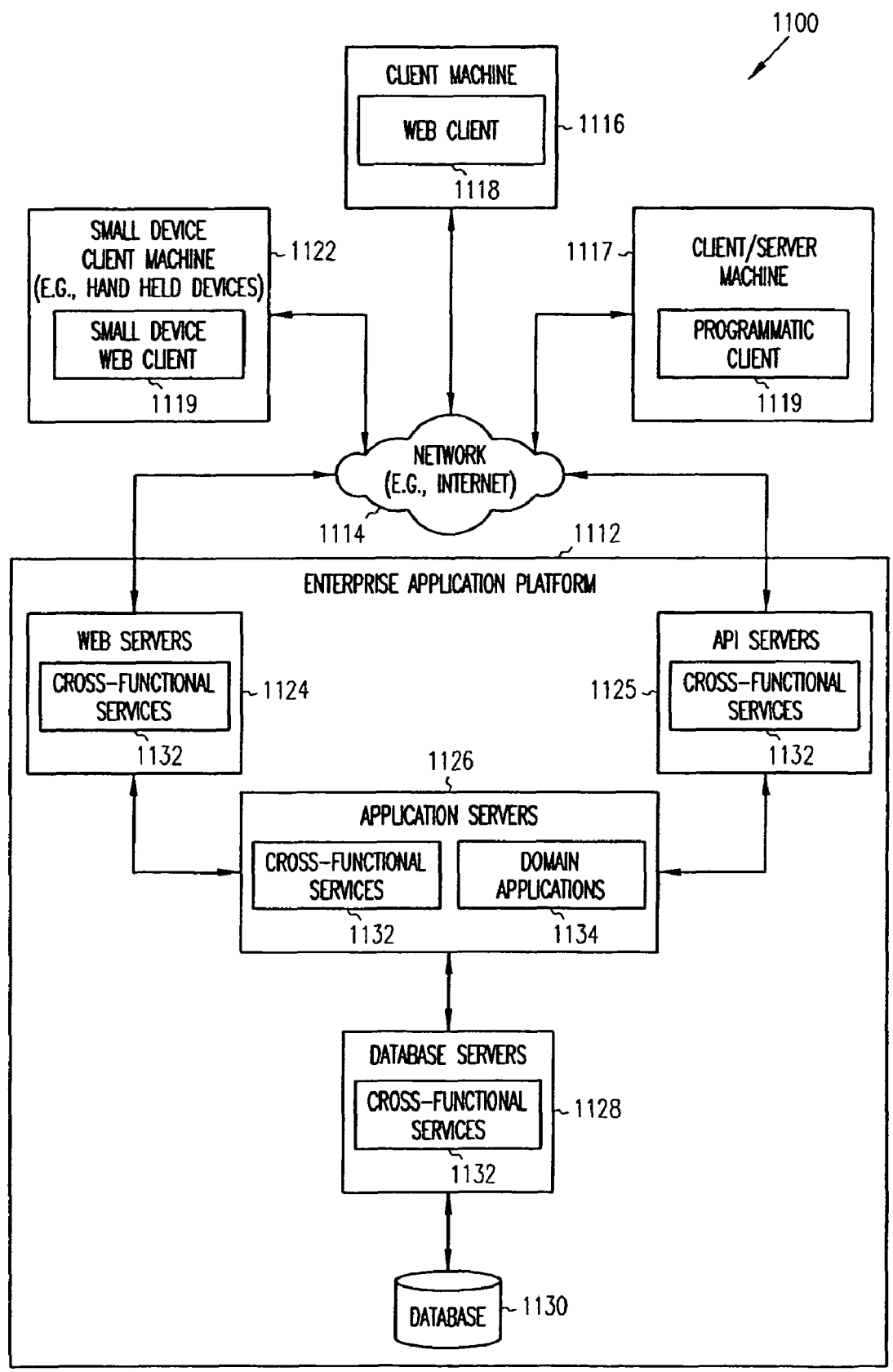
FIG. 6 illustrates another computer system upon which an embodiment of the invention may operate.

FIG. 6 illustrates another example of a network system 1100, having a client server architecture, that an exemplary embodiment disclosed herein can operate on and in connection with. A platform (e.g., machines and software), in the exemplary form of an enterprise application platform 1112, provides server-side functionality, via a network 1114 (e.g., the Internet) to one or more clients. FIG. 6 illustrates, for example, a client machine 1116 with web client 1118 (e.g., a browser, such as the INTERNET EXPLORER browser developed by Microsoft Corporation of Redmond, Washington State), a small device client machine 1122 with a small device web client 1119 (e.g., a browser without a script engine) and a client/server machine 1117 with a programmatic client 1119.

Turning specifically to the enterprise application platform 1112, web servers 1124, and Application Program Interface (API) servers 1125 are coupled to, and provide web and programmatic interfaces to, application servers 1126. The application servers 1126 are, in turn, shown to be coupled to one or more databases servers 1128 that facilitate access to one or more databases 1130. The web servers 1124, Application Program Interface (API) servers 1125, application servers 1126, and database servers 1128 host cross-functional services 1132. The application servers 1126 further host domain applications 1134.

The cross-functional services 1132 provide services to users and processes that utilize the information enterprise application platform 1112. For instance, the cross-functional services 1132 provide portal services (e.g., web services), database services and connectivity to the domain applications 1134 for users that operate the client machine 1116, the client/server machine 1117 and the small device client machine 1122. In addition, the cross-functional services 1132 provide an environment for delivering enhancements to existing applications and for integrating third party and legacy applications with existing cross-functional services 1132 and domain applications 1134. Further, while the system 1100 shown in FIG. 6 employs a client-server architecture, the present invention is of course not limited to such an architecture, and could equally well find application in a distributed, or peer-to-peer, architecture system.

Figure 7:
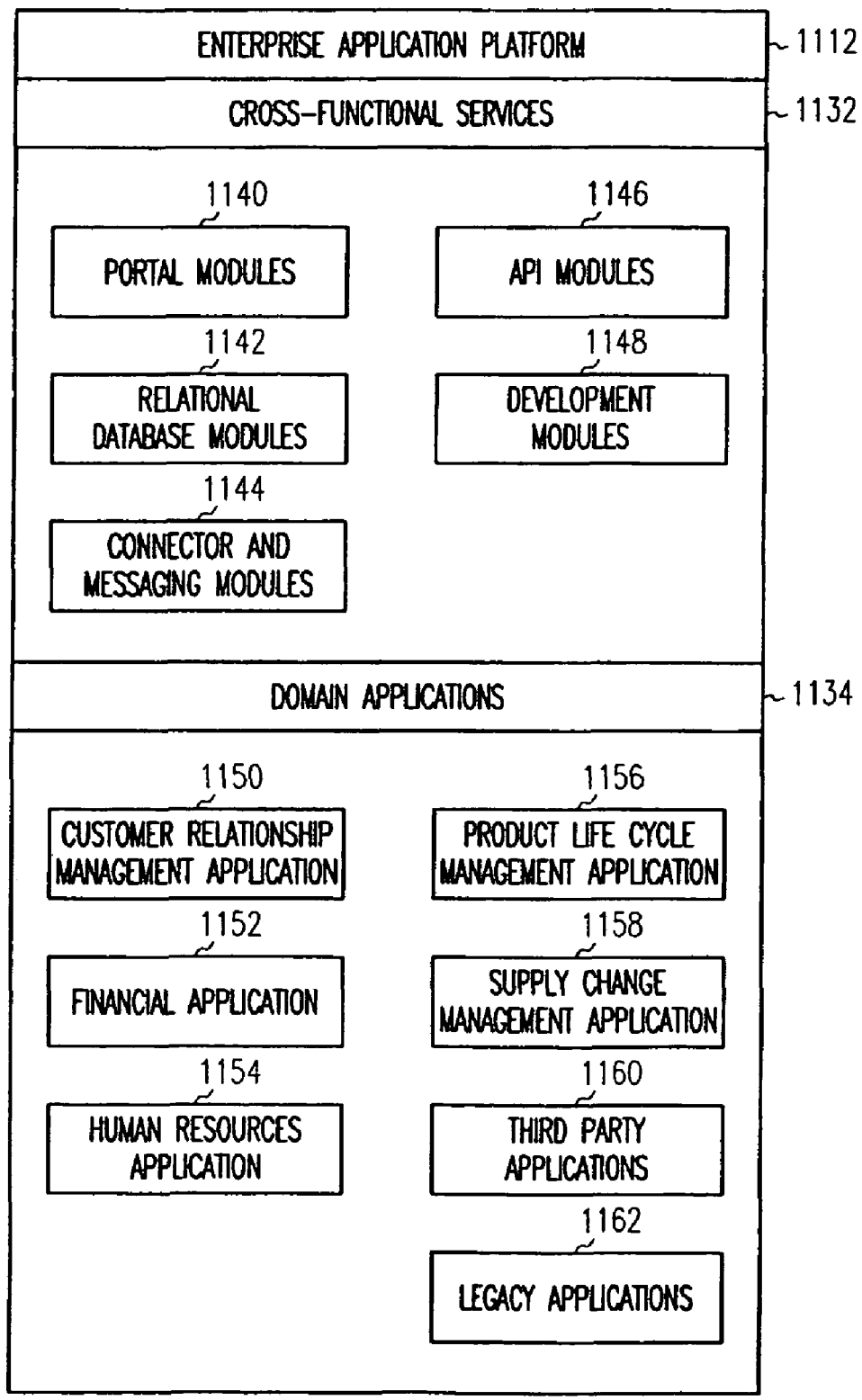
FIG. 7 illustrates a database schema that can be used in connection with the computer system of FIG. 6.

FIG. 7 is a block diagram illustrating enterprise applications and services as embodied in the enterprise application platform 1112, within which an exemplary embodiment of the present invention may be deployed. The enterprise application platform 1112 includes cross-functional services 1132 and domain applications 1134. The cross-functional services 1132 include portal modules 1140, relational database modules 1142, connector and messaging modules 1144, Application Program Interface (API) modules 1146, and development modules 1148.

The portal modules 1140 enable a single point of access to other cross-functional services 1132 and domain applications 1134 for the client machine 1116, the small device client machine 1122 and the client/server machine 1117. The portal modules 1140 are utilized to process, author and maintain web pages that present content (e.g., user interface elements and navigational controls) to the user. In addition, the portal modules 1140 enable user roles, a construct that associates a role with a specialized environment that is utilized by a user to execute tasks, utilize services and exchange information with other users and within a defined scope. For example, the role determines the content that is available to the user and the activities that the user may perform. The portal modules 1140 include a generation module, a communication module, a receiving module and a regenerating module. In addition, the portal modules 1140 comply with web services standards and/or utilize a variety of Internet technologies including Java, J2EE, SAP's Advanced Business Application Programming Language (ABAP) and Web Dynpro, XML, JCA, JAAS, X.509, LDAP, WSDL, WSRR, SOAP, UDDI and Microsoft.NET.

The relational database modules 1142 provide support services for access to the database 1130 that includes a user interface library. The relational database modules 1142 provide support for object relational mapping, database independence and distributed computing. The relational database modules 1142 are utilized to add, delete, update and manage database elements. In addition, the relational database modules 1142 comply with database standards and/or utilize a variety of database technologies including SQL, SQLDBC, Oracle, MySQL, Unicode, JDBC.

The connector and messaging modules 1144 enable communication across different types of messaging systems that are utilized by the cross-functional services 1132 and the domain applications 1134 by providing a common messaging application processing interface. The connector and messaging modules 1144 enable asynchronous communication on the enterprise application platform 1112.

The Application Platform Interface (API) modules 1146 enable the development of service-based applications by exposing an interface to existing and new applications as services. Repositories are included in the platform as a central place to find available services when building applications.

The development modules 1148 provide a development environment for the addition, integration, updating and extension of software components on the enterprise application platform 1112 without impacting existing cross-functional services 1132 and domain applications 1134.

Turning to the domain applications 1134, the customer relationship management applications 1150 enable access to and facilitates collecting and storing of relevant personalized information from multiple data sources and business processes. Enterprise personnel that are tasked with developing a buyer into a long-term customer may utilize the customer relationship management applications 1150 to provide assistance to the buyer throughout a customer engagement cycle.

Enterprise personnel may utilize the financial applications 1152 and business processes to track and control financial transactions within the enterprise application platform 1112. The financial applications 1152 facilitate the execution of operational, analytical and collaborative tasks that are associated with financial management. Specifically, the financial applications 1152 enable the performance of tasks related to financial accountability, planning forecasting, and managing the cost of finance.

The human resource applications 1154 may be utilized by enterprise personal and business processes to manage, deploy, and track enterprise personnel. Specifically, the human resource applications 1154 enable the analysis of human resource issues and facilitate human resource decisions based on real time information.

The product life cycle management applications 1156 enable the management of a product throughout the life cycle of the product. For example, the product life cycle management applications 1156 enable collaborative engineering, custom product development, project management, asset management and quality management among business partners.

The supply chain management applications 1158 enable monitoring of performances that are observed in supply chains. The supply chain management applications 1158 facilitate adherence to production plans and on-time delivery of products and services.

The third party applications 1160, as well as legacy applications 1162, may be integrated with domain applications 1134 and utilize cross-functional services 1132 on the enterprise application platform 1112.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

The invention claimed is:

1. A computer system including:
   at least one memory storage device to store a configuration including a mediation configuration, an adaptation configuration, and a crystallization configuration;
   one or more processors configured to execute a mobile code technology, such that said computer system is capable of transforming between said mediation configuration, said adaptation configuration, and said crystallization configuration; and
   a manager object executable by the one or more processors;
   wherein the manager object is configured to:
      receive notification of an incoming or outgoing object for an object space on which the manager object resides;
      activate or deactivate a program running on the object space on which the manager object resides; and
      copy a program running on the object space on which the manager object resides to another object space, thereby booting up the program on the other object space;
   wherein the mediation, adaptation, and crystallization configurations comprise one or more of a provider object space, an intermediary object space, and a consumer object space; and
   wherein the manager object manages the transformation among the mediation, adaptation, and crystallization configurations by creating, reactivating, copying, or removing one or more proxy objects and one or more converter objects among the provider object space, the intermediary object space, and the consumer object space, thereby transforming the computer system among two or more of the following:
   a loosely coupled mediation configuration system, wherein the provider object space does not need to know the identity of the consumer object space, the provider object space does not need to know how to talk to the consumer object space, and the provider object space does not need to know the data format expected by the consumer object space;
   a tightly coupled crystallization configuration system, wherein the provider object space handles data conversion with the consumer object space and communication with the consumer object space; and
   a middle coupled adaptation configuration system, wherein the provider object space handles data conversion with the consumer object space, and the intermediary object space handles the identity of the consumer object space and the communication between the provider object space and the consumer object space.

2. The computer system of claim 1, wherein
   the provider object space includes data of a first format;
   the intermediary space includes the data of the first format and data of a second format; and
   the consumer object space includes the data of the second format.

3. The computer system of claim 1, wherein the provider object space includes a provider application, a provider wrapper, and a first proxy object.

4. The computer system of claim 1, wherein the intermediary object space includes a converter object and a second proxy object.

5. The computer system of claim 1, wherein the consumer object space includes a consumer wrapper and a consumer application.

6. The computer system of claim 1, wherein the configuration comprises an adaptation configuration including a provider object space, an intermediary object space, and a consumer object space.

7. The computer system of claim 6, wherein
   the provider object space includes data of a first format and data of a second format;
   the intermediary object space includes the data of the second format; and
   the consumer object space includes the data of the second format.

8. The computer system of claim 6, wherein the provider object space includes a provider application, a provider wrapper, a converter, and a first proxy object.

9. The computer system of claim 6, wherein the intermediary object space includes a second proxy object.

10. The computer system of claim 6, wherein the consumer object space includes a consumer wrapper and a consumer application.

11. The computer system of claim 1, wherein the configuration comprises a crystallization configuration including a provider object space and a consumer object space.

12. The computer system of claim 11, wherein
   the provider object space includes data of a first format and data of a second format; and
   the consumer object space includes the data of the second format.

13. The computer system of claim 11, wherein the provider object space includes a provider application, a provider wrapper, a converter, and a proxy object.

14. The computer system of claim 11, wherein the consumer object space includes a consumer application and a consumer wrapper.

15. The computer system of claim 1, wherein the mobile code technology includes Java.

16. The computer system of claim 1,
   wherein the manager object transforms the mediation configuration to the adaptation configuration by:
      creating or reactivating a first proxy object in the provider object space;
      copying or reactivating a converter object into the provider object space; and
      removing or deactivating a second proxy object from the provider object space;
   wherein the manager object transforms the adaptation configuration to the mediation configuration by:
      reactivating the first proxy object in the provider object space;
      deactivating the converter object in the provider object space;
      deactivating the second proxy object in the provider object space; and
      creating or reactivating the converter object in the intermediary object space;
   wherein the manager object transforms the adaptation configuration to the crystallization configuration by:

copying the first proxy object from the intermediary object space to the provider object space; and deactivating the second proxy object in the provider object space; and wherein the manager object transforms from the crystallization configuration to the adaptation configuration by:

deactivating the first proxy object in the provider object space;

creating or reactivating the second proxy object in the provider object space; and creating or reactivating a third proxy object in the provider object space.

17. A computer architecture including:

at least one memory storage device to store a mediation configuration, an adaptation configuration, and a crystallization configuration;

one or more processors configured as a mobile code technology that enables the computer architecture to transform among the mediation configuration, the adaptation configuration, and the crystallization configuration; and a manager object executable by the one or more processors;

wherein the mediation configuration includes a provider object space, an intermediary object space, and a consumer object space;

wherein in the mediation configuration the provider object space includes a provider application, a provider wrapper, a first proxy object, and data of a first format; and wherein in the mediation configuration the intermediary object space includes a converter, a second proxy object, and data of the first format and data of a second format; and wherein in the mediation configuration the consumer object space includes a consumer application, a consumer wrapper, and the data of the second format;

wherein the adaptation configuration includes the provider object space, the intermediary object space, and the consumer object space;

wherein in the adaptation configuration the provider object space includes the provider application, the provider wrapper, the converter, the first proxy object, and the data of the first format and the data of the second format;

wherein in the adaptation configuration the intermediary object space includes the second proxy object and the data of the second format; and wherein in the adaptation configuration the consumer object space includes the consumer application, the consumer wrapper, and the data of the second format;

wherein the crystallization configuration includes the provider object space and the consumer object space;

wherein in the crystallization configuration the provider object space includes the provider application, the provider wrapper, the converter, the first proxy object, and the data of the first format and the data of the second format; and wherein in the crystallization configuration the consumer object space includes the consumer application, the consumer wrapper, and data of the second format;

wherein the manager object is configured to:

receive notification of an incoming or outgoing object for an object space on which the manager object resides;

activate or deactivate a program running on the object space on which the manager object resides; and copy a program running on the object space on which the manager object resides to another object space, thereby booting up the program on the other object space; and wherein the manager object manages the transformation among the mediation, adaptation, and crystallization configurations by creating, reactivating, copying, or removing one or more proxy objects and one or more converter objects among the provider object space, the intermediary object space, and the consumer object space, thereby transforming the computer system among two or more of the following:

a loosely coupled mediation configuration system, wherein the provider object space does not need to know the identity of the consumer object space, the provider object space does not need to know how to talk to the consumer object space, and the provider object space does not need to know the data format expected by the consumer object space;

a tightly coupled crystallization configuration system, wherein the provider object space handles data conversion with the consumer object space and communication with the consumer object space; and a middle coupled adaptation configuration system, wherein the provider object space handles data conversion with the consumer object space, and the intermediary object space handles the identity of the consumer object space and the communication between the provider object space and the consumer object space.

18. The computer architecture of claim 17, wherein in the mediation configuration, the first proxy object in the provider object space transmits the data of the first format from the provider object space to the intermediary object space;

the converter in the intermediary object space converts the data of the first format into the data of the second format; and the second proxy object in the intermediary object space transmits the data of the second format from the intermediary object space to the consumer object space.

19. The computer architecture of claim 17, wherein in the adaptation configuration, the converter in the provider object space converts the data in the first format to the data in the second format;

the proxy object in the provider object space transmits the data in the second format from the provider object space to the intermediary object space; and the proxy object in the intermediary object space transmits the data in the second format from the intermediary object space to the consumer object space.

20. The computer architecture of claim 17, wherein in the crystallization configuration, the converter in the provider object space converts the data of the first format into the data of the second format; and the proxy object in the provider object space transmits the data of the second format to the consumer object space.

21. A computerized method including:

providing in one or more computer memory storage devices a first object space and a second object space, the first object space and the second object space forming a mediation configuration, an adaptation configuration, or a crystallization configuration; and providing a third object space, the third object space serving as an intermediary between the first object space and the second object space;

providing a first software application executable by one or more processors and a second software application executable by the one or more processors, the first software application residing in the first object space and including data in a first format, and the second software application residing in the second object space and including data in a second format;

converting data in the first object space from the first format into the second format;

transmitting the data in the second format from the first object space to the second object space; and providing a manager object in the one or more computer memories that upon execution by the one or more processors receives notification of an incoming or outgoing object for an object space on which the manager object resides, activates or deactivates a program running on the object space on which the manager object resides, and copies a program running on the object space on which the manager object resides to another object space, thereby booting up the program on the other object space;

wherein the mediation, adaptation, and crystallization configurations comprise one or more of the first object space, the second object space, and the third object space; and wherein the manager object manages the transformation among the mediation, adaptation, and crystallization configurations by creating, reactivating, copying, or removing one or more proxy objects and one or more converter objects among the first object space, the second object space, and the third object space, thereby transforming the computer system among two or more of the following:

a loosely coupled mediation configuration system, wherein the first object space does not need to know the identity of the third object space, the first object space does not need to know how to talk to the third object space, and the first object space does not need to know the data format expected by the third object space;

a tightly coupled crystallization configuration system, wherein the first object space handles data conversion with the third object space and communication with the third object space; and a middle coupled adaptation configuration system, wherein the first object space handles data conversion with the third object space, and the second object space handles the identity of the third object space and the communication between the first object space and the third object space.

22. The method of claim 21, further including:

converting the data in the first format in the first object space into the data in the second format;

transmitting the data in the second data format from the first object space to the third object space; and transmitting the data in the second data format from the third object space to the second object space.

23. The method of claim 21, further including:

transmitting data in the first format from the first object space to the third object space;

converting the data in the first format in the third object space into the data in the second format; and transmitting the data in the second format from the third object space to the second object space.

24. A tangible non-transitory machine readable medium including instructions to cause a machine to perform a process including:

providing in one or more computer memory storage devices a first object space and a second object space, the first object space and the second object space forming a mediation configuration, an adaptation configuration, or a crystallization configuration; and providing a third object space, the third object space serving as an intermediary between the first object space and the second object space;

providing a first software application executable by one or more computer processors and a second software application executable by the one or more computer processors, the first software application residing in the first object space and including data in a first format, and the second software application residing in the second object space and including data in a second format;

converting data in the first object space from the first format into the second format;

transmitting the data in the second format from the first object space to the second object space; and providing a manager object in the one or more computer memories that upon execution by the one or more computer processors receives notification of an incoming or outgoing object for an object space on which the manager object resides, activates or deactivates a program running on the object space on which the manager object resides, and copies a program running on the object space on which the manager object resides to another object space, thereby booting up the program on the other object space;

wherein the mediation, adaptation, and crystallization configurations comprise one or more of the first object space, the second object space, and the third object space; and wherein the manager object manages the transformation among the mediation, adaptation, and crystallization configurations by creating, reactivating, copying, or removing one or more proxy objects and one or more converter objects among the first object space, the second object space, and the third object space, thereby transforming the computer system among two or more of the following:

a loosely coupled mediation configuration system, wherein the first object space does not need to know the identity of the third object space, the first object space does not need to know how to talk to the third object space, and the first object space does not need to know the data format expected by the third object space;

a tightly coupled crystallization configuration system, wherein the first object space handles data conversion with the third object space and communication with the third object space; and a middle coupled adaptation configuration system, wherein the first object space handles data conversion with the third object space, and the second object space handles the identity of the third object space and the communication between the first object space and the third object space.

25. The tangible non-transitory machine readable medium of claim 24, further including:

converting the data in the first format in the first object space into the data in the second format;

transmitting the data in the second data format from the first object space to the third object space; and transmitting the data in the second data format from the third object space to the second object space.

26. The tangible non-transitory machine readable medium of claim 24, further including:

transmitting the data in the first format from the first object space to the third object space;

converting data in the first format in the third object space into the data in the second format; and transmitting the data in the second data format from the third object space to the second object space.

* * * * *